United States Patent [19]

Rood

[11] 4,430,886

[45] Feb. 14, 1984

[54] METHOD AND APPARATUS FOR SENSING CLOGGED NOZZLE

[75] Inventor: Alvin A. Rood, Oberlin, Ohio

[73] Assignee: Nordson Corporation, Amherst, Ohio

[21] Appl. No.: 339,730

[22] Filed: Jan. 15, 1982

[51] Int. Cl.³ .............................................. G01B 13/00

[52] U.S. Cl. .......................................... 73/37; 73/168; 239/71; 239/525

[58] Field of Search ............... 73/37, 38, 168; 239/71, 239/525, 526; 340/611

[56] References Cited

U.S. PATENT DOCUMENTS

| | | | |
|---|---|---|---|
| 1,288,363 | 12/1918 | Young | 73/168 |
| 3,268,092 | 11/1966 | Laza | 73/168 X |
| 3,482,781 | 12/1969 | Sharpe | 239/71 |
| 4,103,534 | 8/1969 | Hoof | 73/37 |
| 4,117,717 | 10/1978 | Isley | 73/38 |

*Primary Examiner*—Herbert Goldstein

*Attorney, Agent, or Firm*—Wood, Herron & Evans

[57] ABSTRACT

A method and apparatus for sensing and signaling a clogged nozzle condition in a spray gun of the type which includes a valve located adjacent the nozzle. The gun includes a restrictor located in the liquid flow path upstream of the valve and a pressure transducer located between the restrictor and the valve for measuring pressure drop when the valve of the gun is opened. A pressure drop of less than a predetermined amount is indicative of a clogged nozzle condition.

14 Claims, 7 Drawing Figures

METHOD AND APPARATUS FOR SENSING CLOGGED NOZZLE

This invention relates to liquid spray apparatus and more particularly to a method and apparatus for detecting a clogged or partially clogged condition of the nozzle of such apparatus.

There are many high speed coating applications wherein a liquid spray is applied to multiple discrete objects as the objects pass a spray gun. In most of these applications the spray gun is turned on and off at the frequency of objects passing the gun. One such application occurs in the coating of cans wherein either the can bodies or can ends are spray coated with a thin film of lacquer or other protective coating material as the can bodies or ends pass the gun. Quite commonly these can parts pass the gun at the rate of several hundred per minute and the gun is cycled, i.e., turned on and off, at that same frequency.

One common problem in the coating of can bodies or can ends is insuring that the complete can interior surface is coated with the coating material. The purpose of the coating on the interior surface of the can is to prevent the can contents, as for example a food or beverage, from contacting the metal of the can body or end. Any such contact of a food or beverage results in contamination of the food or beverage and therefore the coating must be 100% complete and impervious to liquid. Any pin holes, cracks or imperfections of any kind cannot be tolerated. But, while complete surface coverage is critical, it is also important that no excess material be applied to the surface because of the very large number of cans being coated. Each spray applicator applies coating to literally millions of cans in the course of a year and therefore the spraying of excess material to insure complete surface coverage is very expensive over a long period of time.

In the coating of can bodies, as in the coating of any surface which requires 100% surface coverage, there must be some excess material applied in order to provide some margin for error. However, in the can coating industry, as in many high speed coating applications, that margin for error is minimal, quite commonly 10 or 15 percent. A problem therefore arises if for any reason the spray emitted from the nozzle of the gun drops below that minimal safety margin, i.e., drops below that 10 or 15 percent safety margin.

Still another problem which occurs in high speed coating, but particularly in the coating of cans, is in determining when the spray has dropped below the safety margin and objects are being less than completely covered with spray material. This problem is particularly acute if the sprayed material is transparent, as for example a clear lacquer such as is commonly applied in the can industry. In that event, less than complete coverage of a surface cannot be detected visually and must be detected by some testing procedure, usually a random sampling test of the products. But that random sampling test may allow some partially coated products to pass before the sampling procedure detects or identifies the problem.

It has therefore been one objective of this invention to provide a method and apparatus for determining whenever a high speed liquid coating apparatus is effecting less than 100% surface coverage of the objects being sprayed by the apparatus.

Still another objective of this invention has been to provide a method and apparatus for determining when a spray gun is dispensing less than a predetermined quantity of material onto a sprayed object. Otherwise expressed, an objective of this invention has been to provide a method and apparatus for determining whenever less than a predetermined flow rate is being dispensed from a spray nozzle.

Still another objective of this invention has been to provide a method and apparatus which is very sensitive to changes in flow from a liquid spray nozzle and therefore capable of determining a relatively small change in the flow rate from the nozzle.

These objectives are accomplished and this invention is predicated upon the concept of measuring a pressure signal internally of the gun at a location between the valve of the gun and a restriction contained internally of the gun and utilizing that signal to determine the condition of the nozzle and particularly whether that nozzle is partially clogged. In practice, it has been found that by locating a restriction or restricted orifice upstream of the valve in the liquid flow stream to the valve and by measuring the pressure drop of the liquid in that flow stream when the valve is open, it is possible to determine the condition of the nozzle and whether that nozzle is partially clogged. If the restriction upstream of the valve has a flow rate approximately three times the flow rate of the nozzle orifice, there is a resulting pressure drop of approximately 10% of nozzle discharge pressure between the restriction and the nozzle orifice when the valve is opened so long as the nozzle orifice is unrestricted or unclogged. If the nozzle orifice becomes partially restricted or clogged, there is an additional pressure drop of less than 10% of the nozzle discharge pressure indicating the condition. Of course, if the nozzle orifice becomes completely clogged, there will be no pressure drop upon opening of the valve.

The primary advantage of this invention is that it enables the condition of the nozzle, and whether it is partially clogged, to be measured at a location remote from the nozzle without either a visual inspection of the nozzle or of the products coated by the nozzle. This clogged condition or partially clogged condition can usually be detected by the practice of this invention long before the condition can be visually detected by inspection of the part or the nozzle. In the case of can coating applications this invention often enables a clogged condition of the nozzle to be detected even before it would otherwise be picked up by destructive or non-destructive tests of the coated product.

These and other objects and advantages of this invention will be more readily apparent from the following description of the drawings in which.

Figure 1:
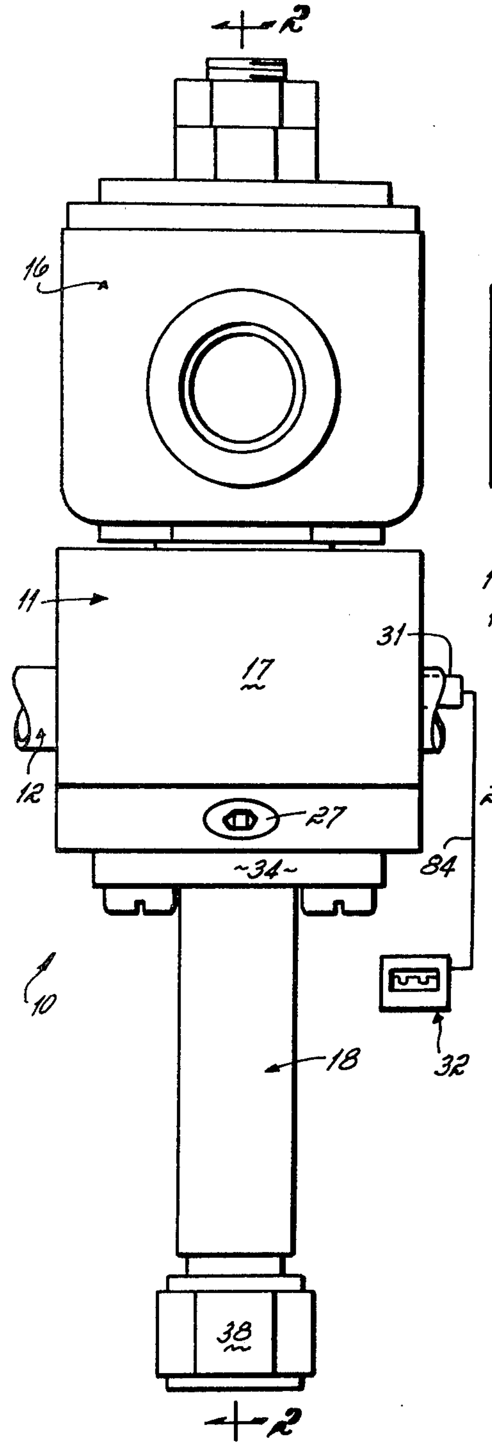
FIG. 1 is a side elevational view of a dispensing gun incorporating the invention of this application.
Figure 2:
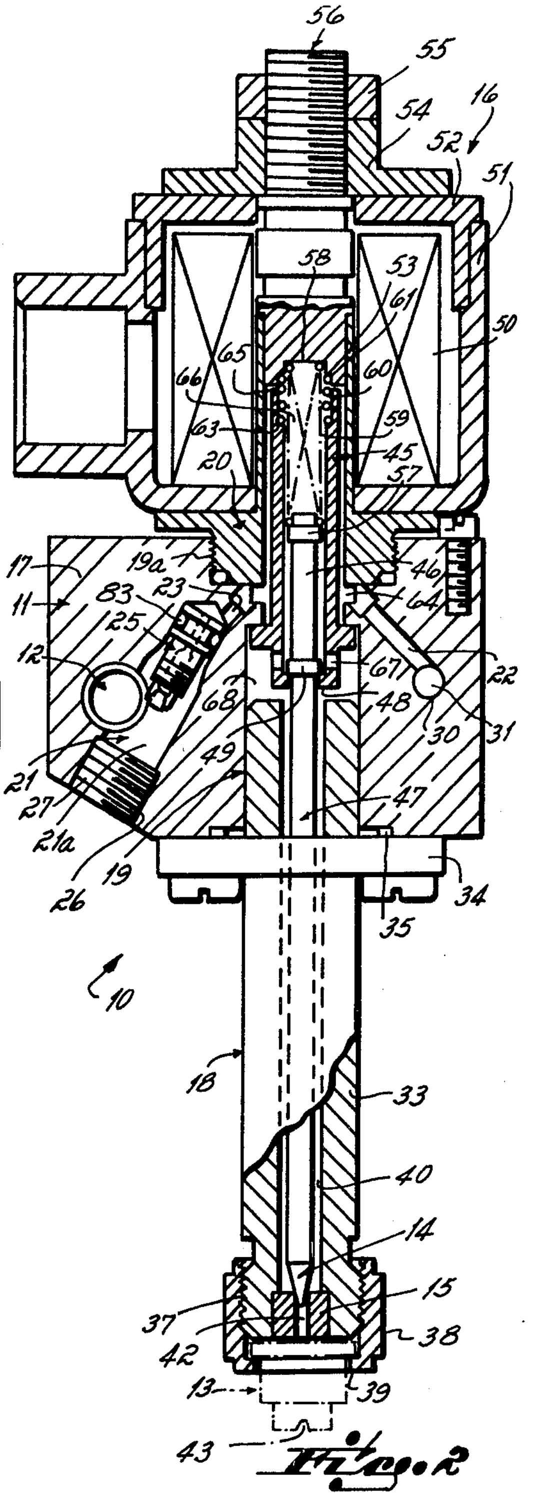
FIG. 2 is a cross sectional view of the dispensing gun taken on line 2—2 of FIG. 1.

With reference to FIGS. 1 and 2 there is illustrated a dispensing gun 10 incorporating the invention of this application. Generally, this gun 10 comprises a body 11 through which liquid is supplied from an inlet 12 to a nozzle 13. Internally of the body there is a valve 14 and valve seat 15 for controlling flow of the liquid from the inlet 12 to the nozzle 13. Opening and closing of the valve 14 is controlled by a solenoid 16 mounted atop the body 11.

The body 11 comprises a ported body block 17 and a body extension 18 secured to that block. The block has an axial throughbore 19 counterbored and threaded as indicated at 19*a* for the reception of a threaded sleeve 20 of the solenoid. This axial throughbore 19 is intersected by a connecting passage 21 and a pressure take-off passage 22. The passage 21 interconnects the inlet passage 12 with the axial throughbore 19 and comprises a first large diameter section 21*a* and a small diameter end section 23. As explained more fully hereinafter, a calibrated restriction 25 is mounted within the small diameter section 23 of the connecting passage 21. At its outer end the passage 21 is threaded as indicated at 26. A pipe threaded plug 27 is mounted within the threaded section 26 of the passage 21 so as to close that passage to all but the inlet passage 12.

The pressure take-off passage 22 is open to a transducer mounting passage 30 within the body block 17. As explained more fully hereinafter, a transducer 31 is mounted within the passage 30. This transducer is operative to sense and transmit to a read-out device 32 a pressure signal indicative of pressure of liquid flowing through the gun.

The gun body extension 18 comprises a tubular section 33 from which there extends a flange 34. This flange is bolted to the underside of the body block 17 by conventional threaded connectors. There is preferably an O-ring 35 sandwiched between the top surface of the flange 34 and the bottom surface of the block 17.

The lower end of the body extension 18 is externally threaded as indicated at 37 for reception of a nozzle nut 38. This nozzle nut has an inwardly extending flange 39 engageable with the nozzle 13 for securing the nozzle to the outer end of the body extension.

An axial bore 40 extends through the body extension 18 and communicates with the axial bore 19 of the body block 17. This bore 40 is counterbored at its lower end to receive the valve seat 15 which is fixedly secured therein. An axial passageway 42 extends through this valve seat for accommodating flow of liquid from the bore 40 through the passageway 42 and out of the gun through the orifice 43 of the nozzle 13.

Opening and closing of the valve 14 relative to the valve seat 15 is controlled by the solenoid 16. This solenoid includes an axially movable, tubular shaped armature 45 within which the upper end 46 of the valve stem 47 of valve 14 is slideable. This armature 45 has an inwardly extending lip 48 engageable with an annular flange 49 of the valve stem 47 so that upon upward movement of the armature, the valve stem 47 of the valve 14 is lifted upwardly, thereby lifting the valve 14 from the seat 15 and permitting flow of liquid through the gun as explained more fully hereinafter.

The coil 50 of the solenoid 16 is mounted within a housing 51 which includes a removable cap 52. The housing 51 is mounted over the hub 53 of the sleeve 20 and is secured thereon by a nut housing 54 and lock nut 55. The nut housing 54 and nut 55 are threaded over a plug 56 mounted in the upper end of the sleeve hub 53.

There is a compression spring 59 located between a triangular shaped shoulder 57 on the upper end of the valve stem 47 and a recess 58 in the bottom of the plug 56. This spring 59 biases the valve 14 to a closed position. Additionally, there is a light compression spring 60 sandwiched between a shoulder 61 of the plug 56 and a shoulder 63 of the armature 45. This light compression spring 60 biases the armature 45 to a lower position in which the bottom surface of the lip 48 is engaged with the top surface of the body extension 18. In this lowered position of the armature, the lip 48 is located slightly below and out of engagement with the shoulder 49 of the valve stem so that upon energization of the solenoid coil 50, the armature moves approximately 0.030 inches upwardly before the lip 48 of the armature 45 contacts the shoulder 49 of the valve stem 47 and initiates opening of the valve 14.

When electrical current is supplied to the coil 50 of solenoid 16, the armature 45 of the coil is caused to move upwardly. In the course of this upward movement the lower lip 48 of the armature engages the lower shoulder 49 of the valve stem 47, thereby causing the valve stem to move upwardly and lift valve 14 off of seat 15. When the valve 14 opens, pressurized liquid is free to flow from inlet 12 through the restrictor 25 into a chamber 64 surrounding the armature 45. The liquid flows upwardly through this chamber 64 and through radial slots 65 in the top of the armature into the hollow interior 66 of the armature 45. The liquid then flows downwardly over the generally triangular shaped shoulder 57 of the valve stem and through radial ports 67 in the bottom of the armature into a chamber 68 in the interior of the body block 17. From the chamber 68 the liquid flows over the exterior of the valve stem 47 through the open valve 14 and out of the gun through the nozzle orifice 43.

The solenoid operated dispensing gun 10 heretofore described except for the restriction 25, the pressure take-off passage 22, the transducer passage 30, and the transducer 31, are conventional and have long been available in the commercial market. Per se, this gun forms no part of the invention of this application. Rather, the invention of this application is concerned with the restriction 25, the pressure take-off passages 22, 30 and transducer 31 which enable the condition of the nozzle orifice of the gun to be monitored.

Figure 3:
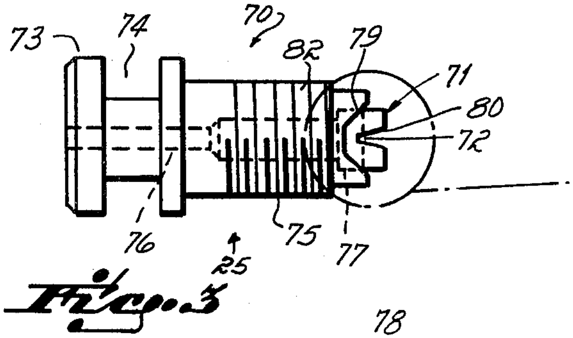
FIG. 3 is an enlarged side elevational view of the restriction employed in the gun of FIG. 1.
Figure 4:
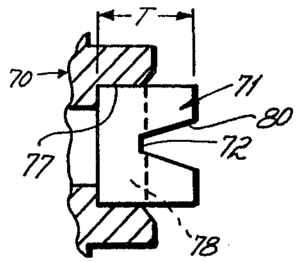
FIG. 4 is an enlarged view of the circled portion of FIG. 3.
Figure 5:
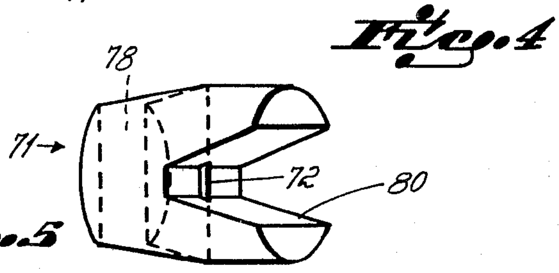
FIG. 5 is a diagrammatic perspective view of the insert used in the restriction of FIG. 4.

With reference now to FIGS. 3, 4 and 5 it will be seen that the restriction 25 comprises a restrictor body 70 and a carbide insert 71. The insert 71 is mounted within the body 70 and provides a restricted orifice 72 through which a controlled flow rate may be established.

The restrictor body 70 comprises a large diameter cylindrical end section 73 within which there is formed an annular groove 74. A smaller diameter cylinder section 75 extends axially from the larger end section 73. Both sections are provided with an axial bore 76. As may be most clearly seen in FIG. 4, the outer end of the passage 76 is counterbored as at 77. The carbide insert 71 is fixedly mounted within this counterbored section 77 of the passage 76. Prior to the insert 71 being mounted within the counterbored section 77 of the passage 76, a V-shaped diametral cut 78 is machined into the inner surface of the insert. This V-shaped cut preferably defines an included angle of 60°. It is ground to a depth of approximately one-half the thickness T of the insert 71. After machining of this cut 78 into the face of the insert, the insert is brazed into the counterbored section 77 of the passage 76. The insert is so oriented in the passage 76 that the diametral cut 78 extends at right angles to a trapezoidal shaped notch 79 formed on the end of the restrictor body 70. After having been brazed into the restrictor body, a second V-shaped notch 80 is machined at right angles to the notch 78. This second notch 80 is machined to a depth at which the two notches 78, 80 intersect, resulting in the small restricted orifice 72 at the point of intersection of the two notches. By carefully grinding the notch 80 progressively deeper into the insert 71, the equivalent diameter of the restricted orifice 72 may be accurately controlled.

The outer end of the smaller diameter section 75 of the body is threaded as indicated at 82. This threading of the end section enables the restrictor 25 to be attached to a tool (not shown) for insertion of the restrictor into the passage 21 of the gun body 17. To retain the restrictor 25 within that passage 21, an O-ring 83 is located within the annular groove 74 of the restrictor body.

In one preferred embodiment of the invention, the orifice 72 of the restriction 25 is sized to have a flow rate 3.162 times the flow rate of the nozzle orifice 43. These relative orifice sizes effect approximately a 10% pressure drop in the pressure of liquid contained within the liquid flow chambers 64, 68 of the gun when the valve 14 of the gun is opened. Otherwise expressed, this relative sizing of the orifices of the restriction 25 and nozzle 13 results in a 10% added pressure drop within the liquid flow chambers 64, 68 of the gun between closed and opened condition of the valve 14. In the absence of the restriction 25 between the inlet 12 of the gun and the valve 14, there would be very little if any appreciable reduction or change in pressure in chambers 64, 68 between closed and opened condition of the valve. Alternatively, if the orifice 72 of the restriction 25 was sized so as to have a flow rate more closely matching that of the orifice 43, there would be a great pressure drop in chamber 68 between closed and opened condition of the valve 14, but there would also be a much greater pressure loss between the inlet 12 of the gun and the flow chambers 64, 68. Consequently, there would be a greater energy loss in liquid flow through the gun. The relative sizing of the orifices 72 and 43 of the restriction and nozzle respectively was chosen so as to generate an appreciable and measurable pressure drop between closed and open condition of the valve 14 while minimizing energy loss effected by the restriction 25.

Figure 6:
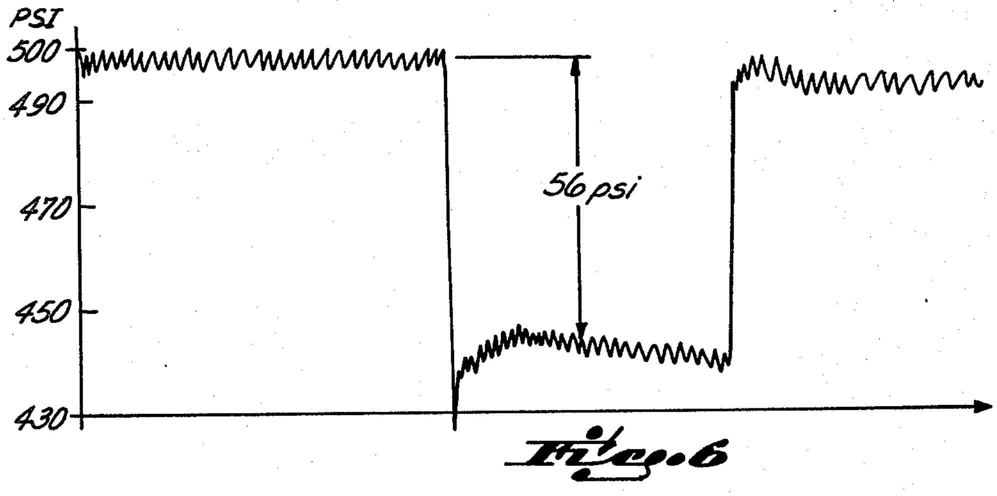
FIG. 6 is a graph of the electrical signal generated by a pressure measuring transducer located within the gun of FIG. 1, which signal is generated when the nozzle is completely open and unclogged.
Figure 7:
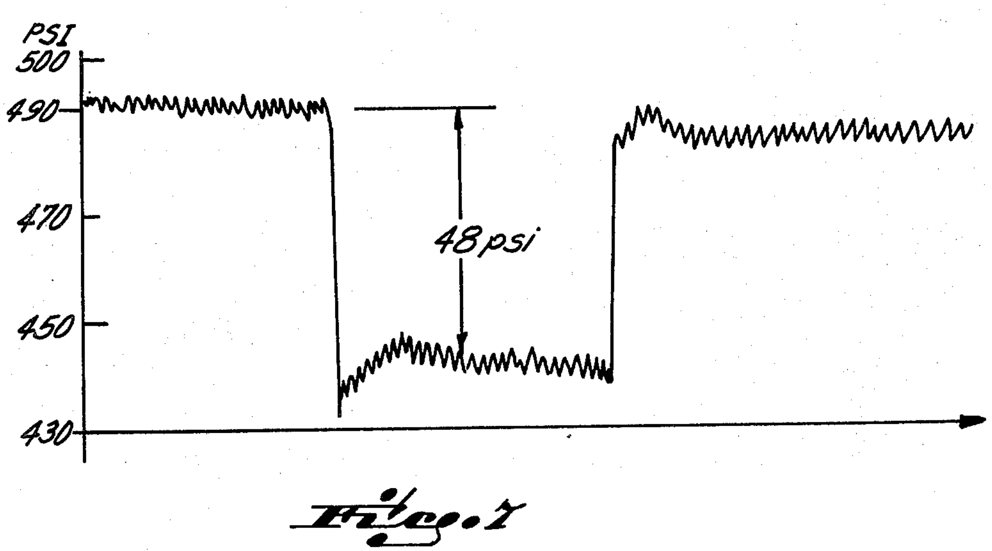
FIG. 7 is a graph similar to FIG. 5 but illustrating the signal generated when the nozzle is partially clogged.

In the operation of the liquid dispensing gun 10, liquid is supplied to the inlet 12 and caused to flow through the passageways 21, 23 into the chambers 64, 68. When the valve 14 of the gun is opened by energization of the solenoid coil 50, liquid is permitted to flow through the valve seat 15 and nozzle orifice 43 onto any substrate located beneath or in front of the gun nozzle. The pressure of fluid within the chamber 64 is measured by the transducer 31. This transducer transmits a signal via a lead 86 to the read-out device 32. In one preferred embodiment of the invention, the read-out is an oscilliscope upon which a pressure reading can be taken. With reference to FIGS. 6 and 7 there is an oscilliscope reading of two different nozzle conditions measured by the transducer 31 of the gun 10. FIG. 6 is a reading generated by the gun 10 when the nozzle 13 of the gun was fully opened and unclogged. As there illustrated, the liquid in chambers 64, 68 was at a pressure of approximately 500 psi when the valve 14 was closed and when the valve 14 was opened, the pressure dropped approximately 56 psi and remained at that lower pressure until the valve 14 was closed, at which time the pressure returned to 500 psi. With reference to FIG. 7 there is illustrated a reading generated by the oscilliscope 32 when the orifice 43 of the nozzle was restricted so as to have 10% less flow than did the nozzle employed in the gun to generate the reading of FIG. 6. All other conditions were substantially the same for obtaining the reading of FIG. 6 and FIG. 7. When the nozzle orifice was partially restricted or clogged so as to have 10% less flow, the transducer 31 of the gun 10 generated the reading of FIG. 7 wherein the pressure dropped 48 psi upon opening of the valve. This reduced pressure drop is indicative of a partially closed nozzle or clogged nozzle condition. In practice, this reduced pressure drop could be used by an operator at a location remote from the gun to indicate that less than full flow is being delivered through the orifice 43 of the nozzle 13 and to trigger stoppage of the gun until the nozzle can be removed and replaced or cleaned.

It will be appreciated that the same transducer signal indicates either a completely clogged condition, in which event there would be no pressure drop between open and closed condition of the valve, or that the nozzle has blown out, in which event there is substantially greater pressure drop than 56 psi upon opening the valve.

The primary advantage of this invention resides in its ability to enable a machine operator to detect a partially clogged nozzle condition. In the event of partial blockage of the nozzle, the reduced pressure drop seen on the oscilliscope 32 indicates immediately to the machine operator that the nozzle orifice is partially clogged and requires cleaning or to be replaced. In the absence of this invention within the gun, the operator can only determine such a condition by observing the spray results, but oftentimes, particularly in the application of clear spray materials it is impossible to observe such reduced flow with the naked eye. In that event reduced flow can only be detected by a lab testing technique. In many applications wherein the gun is spraying articles at the rate of several hundred per minute as is commonly the case in the can coating industry, many cans would receive less than a complete coating before the partially clogged condition could be determined. The invention of this application enables the nozzle condition to be monitored at all times and the usage stopped whenever less than a minimal flow rate is being dispensed from the nozzle orifice While I have described my invention as utilizing an oscilliscope as the pressure monitoring device 32, other devices could be substituted for this read-out device. For example, a control circuit could be substituted which would automatically stop gun operator pressure whenever a less than predetermined value was detected upon opening of the valve of the gun. That same signal could be responsive to a pressure drop in excess of a predetermined value (indicating nozzle blow-out) to terminate operation of the gun. Persons skilled in this art will appreciate other modifications and changes of this invention which may be made without departing from the spirit of my invention. Therefore, I do not intend to be limited except by the scope of the following appended claims.

I claim:

1. The method of sensing partial clogging of a nozzle of a liquid dispensing gun, which gun contains a valve upstream of the nozzle, which method comprises locating a flow restriction in the liquid flow stream upstream of the gun valve, and measuring pressure changes in the flow stream between the flow restriction and the valve when the valve is changed from closed to open condition whereby a pressure change of less than a predetermined value is indicative of a partially clogged nozzle.

2. The method of claim 1 wherein said pressure change is measured by a pressure transducer and is translated by the transducer from a pressure to an electrical signal.

3. The method of sensing as little as 10% partial blockage of a nozzle of a liquid dispensing gun, which gun contains a valve upstream of the nozzle, which method comprises locating a flow restriction in the liquid flow stream upstream of the gun valve, and measuring pressure changes in the flow stream between the flow restriction and the valve when the valve is changed from closed to open condition whereby a pressure change of less than a predetermined value is indicative of a partially blocked nozzle.

4. The method of claim 3 wherein said pressure change is measured by a pressure transducer and is translated by the transducer from a pressure to an electrical signal.

5. In combination, a liquid dispensing gun having a nozzle and apparatus for sensing partial clogging of said nozzle of said gun, said gun comprising a valve upstream of said nozzle, a flow restriction in the liquid flow stream through the gun upstream of said gun valve, and means for measuring pressure changes in the flow stream between the flow restriction and the valve when the valve is changed from closed to open condition whereby a pressure change of less than a predetermined value is indicative of a partially clogged nozzle.

6. The combination of claim 5 wherein said pressure change measuring means includes a pressure transducer operative to convert a pressure signal into an electrical signal.

7. In combination, a liquid dispensing gun having a nozzle and apparatus for sensing as little as 10% partial blockage of said nozzle of said gun, said gun comprising a valve upstream of said nozzle, a flow restriction in the liquid flow stream through the gun upstream of said gun valve, and means for measuring pressure changes in the flow stream between the flow restriction and the valve when the valve is changed from closed to open condition whereby a pressure change of less than a predetermined value is indicative of a partially blocked nozzle.

8. The combination of claim 7 wherein said pressure change measuring means includes a pressure transducer operative to convert a pressure signal into an electrical signal.

9. In combination, a liquid dispensing gun and apparatus for sensing a partially clogged nozzle outlet of said gun, said liquid dispensing gun comprising a gun body, said gun body having a liquid flow inlet, a nozzle outlet and a liquid flow passage between said inlet and nozzle outlet, a valve seat located in said flow passage at a location near said nozzle outlet, a valve engageable with said valve seat, and means for actuating said valve so as to control flow of liquid from said nozzle outlet, said sensing apparatus comprising a flow restriction located within said liquid flow passage upstream of said valve, and means for measuring pressure changes in the liquid contained in said flow passage between said flow restriction and said valve seat when the valve is changed from open to closed condition whereby a pressure change of less than a predetermined value is indicative of a partially clogged nozzle outlet.

10. The combination of claim 9 wherein said means for actuating said valve comprises an electrical solenoid, said solenoid having an armature operatively connected to said valve.

11. The combination of claim 9 wherein said valve is spring biased to a closed condition.

12. The combination of claim 9 wherein said flow restriction comprises a metal plug contained within said flow passage, said plug having a passageway extending therethrough, and a carbide insert contained within said passageway of said metal plug, said carbide insert having a restricted flow orifice formed therein.

13. The combination of claim 12 whereby said carbide insert is shaped as a disc, said disc having a first slot extending diametrically across one face thereof on one side of said disc, and said disc having a second slot extending diametrically across a second face thereof on the opposite side thereof, said slots being oriented perpendicular to one another and partially intersecting one another to define the restricted flow orifice in said insert.

14. The combination of claim 9 wherein said flow restriction has a flow rate approximately three times the flow rate of said nozzle outlet.

* * * * *